UNITED STATES PATENT OFFICE.

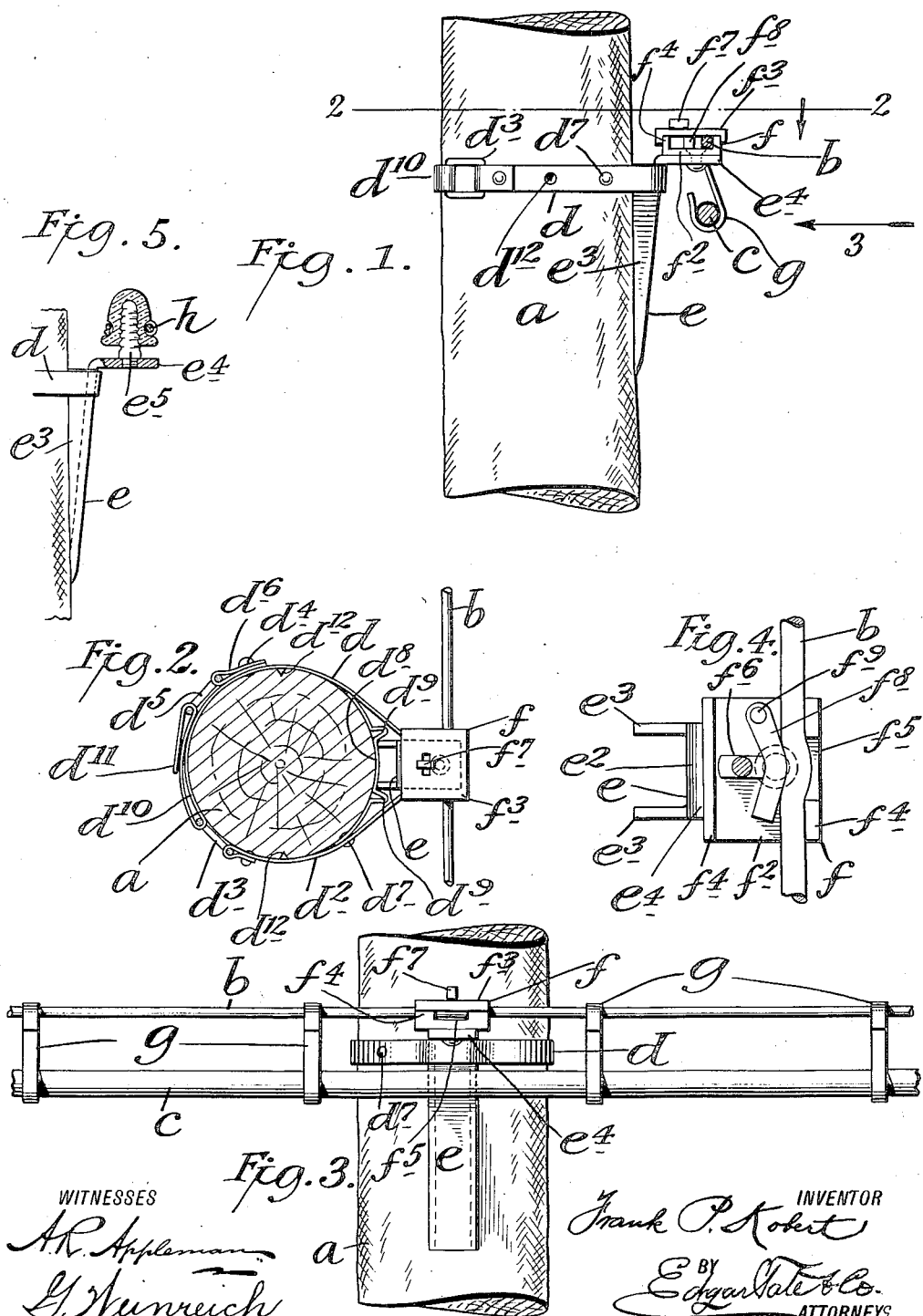

FRANK P. KOBERT, OF WOODSIDE, NEW YORK.

CABLE-SUPPORTING DEVICE.

1,050,364.  Specification of Letters Patent.  Patented Jan. 14, 1913.

Application filed March 1, 1912. Serial No. 680,882.

*To all whom it may concern:*

Be it known that I, FRANK P. KOBERT, a citizen of the United States, and residing at Woodside, Long Island, in the county of Queens and State of New York, have invented certain new and useful Improvements in Cable-Supporting Devices, of which the following is a specification, such as will enable those skilled in the art to which it appertains to make and use the same.

This invention relates to devices for supporting telegraph wires, telegraph, telephone and other cables in connection with telegraph poles, posts or similar supports, and the object thereof is to provide a simple, effective and economical device of this class which may be quickly and easily attached to a telegraph pole or similar support, and which involves two parts one of which comprises a clamp band member which encircles the pole or posts, and the other a wedge member which is used in connection therewith and which supports a clamp with which is connected a wire from which a cable is suspended.

The invention is fully disclosed in the following specification of which the accompanying drawing forms a part in which the separate parts of my invention are designated by suitable reference characters in each of the views and in which:—

Figure 1 is a view showing my improvement used as a cable support and attached to a telegraph pole; Fig. 2 a section on the line 2—2 of Fig. 1; Fig. 3 a view looking in the direction of the arrow 3, of Fig. 1; Fig. 4 a section plan view of a clamp device which I employ, and which is also shown in Figs. 1 and 2, and Fig. 5 a view similar to Fig. 1 and showing my improvement used as a telegraph wire support.

In the drawing forming part of this specification I have shown at $a$ an ordinary telegraph pole, and at $b$ a wire which is used to support a telegraph, telephone, or similar cable $c$.

In the practice of my invention I provide an attachment for the pole $a$ which comprises a clamp band member $d$ and a wedge member $e$, and a wire clamp $f$. In forming the clamp member $d$ I provide a metal strip $d^2$ with one end of which is connected a link $d^3$, and connected with said strip $d^2$ at $d^4$ is another link member $d^5$, this connection being made by means of a separate metal loop $d^6$ secured to the strip $d^2$. I also secure to, and on the inner side of the strip $d^2$, as shown at $d^7$, a supplemental strip $d^8$, which is only about a third of the length of the strip $d^2$ and which is bent at two points to form outwardly directed loop shaped projections $d^9$.

In connecting the clamp band member $d$ with the pole the strip $d^2$ is passed around the pole, and the end $d^{10}$ thereof is first passed through the link $d^3$ and then through the link $d^5$ and drawn tight and folded down, as shown at $d^{11}$, and this securely connects this part of the attachment with the pole.

The wedge member $e$ comprises a back part or plate $e^2$ and tapered side members $e^3$, and the back part of the plate $e^2$ is provided with an outwardly directed shelf or support $e^4$, and in practice the wedge member $e^3$ is driven downwardly between the strip $d^2$ and the strip $d^8$, and between the outwardly directed projections $d^9$ thereof. This operation securely clamps the clamp band member to the pole, and it cannot be detached without reversing the above operation, or by releasing the end $d^{11}$ of the strip $d^2$ from the loop $d^6$, and this may be done either with or without removing the wedge member $e$.

The clamp $f$ is secured to the shelf or support $e^4$ of the wedge member $e$, and the wire $b$ is passed through this clamp and then drawn taut in the usual manner and the clamp is manipulated so as to lock said wire against longitudinal movement, and the cable $c$ is suspended from said wire by clips $g$ or in any other suitable way.

The clamp member $f$, in the construction shown, is box-shaped in form and comprises a bottom member $f^2$ and top member $f^3$, and the bottom member $f^2$ has parallel raised side portions $f^4$, and the outer side portion is provided centrally thereof with an opening $f^5$, and a key device $f^6$ is mounted centrally in said clamp member provided with a head $f^7$ by which it may be operated, and said key device operates in connection with a jaw member $f^8$ pivoted at $f^9$ and adapted to bear on the wire $b$ so as to lock said wire in position and prevent its longitudinal movement.

My invention is not limited to the exact construction of the clamp device $f$ and any suitable device of this class may be employed, my said invention consisting of the clamp band member $d$ and the wedge member $e$ constructed and operating as described, said wedge member forming a support for the suitable clamp $f$.

In Fig. 5, I have shown my improvement applied as a telegraph wire support, and in this construction the part $e^4$ of the wedge member $e$ is provided with a plug $e^5$ with which a telegraph wire $h$ is connected in the usual manner.

From the foregoing description it will be seen that my improved pole attachment, wire or cable support may be quickly and easily connected with a pole or post, and as easily and quickly detached therefrom whenever desired, but said attachment will remain secured in position until intentionally detached, the accidental loosening or detachment thereof from the pole being impossible, and the flexible strip $d^2$ may be provided with inwardly directed teeth $d^{12}$ if desired, which will aid in preventing the attachment from slipping on the pole.

In the construction shown the supplemental strip $d^8$ is secured at but one end only, but the connection of this strip with the strip $d^2$ may be made in any desired manner; and it will be also seen that my invention is not limited to the use of the supplemental strip $d^8$, as the attachment may be made to work without it; and changes in and modifications of, the construction described may be made within the scope of the appended claims, without departing from the spirit of my invention or sacrificing its advantages.

Having fully described my invention what I claim as new and desire to secure by Letters Patent is:—

1. A device of the class described comprising a flexible band adapted to be folded around and secured to and encircle a pole or post, and the length of which is adjustable, and a wedge adapted to be driven between the band and the pole or post for tightening said band on said pole or post, said wedge device being provided with a support for a wire or cable.

2. In a cable support, a pole attachment comprising a flexible band provided at one end with a link member and at a predetermined distance from the opposite end with another link member, a flexible strip secured to the inner side of the band between said link members, and a wedge device adapted to be driven downwardly between said band and the said strip.

3. In a cable support, a pole attachment comprising a flexible band provided at one end with a link member and at a predetermined distance from the opposite end with another link member, a flexible strip secured to the inner side of the band between said link members, and a wedge device adapted to be driven downwardly between said band and the said strip, said wedge device also serving as a support for a wire clamp.

In testimony that I claim the foregoing as my invention I have signed my name in presence of the subscribing witnesses this 28th day of February, 1912.

FRANK P. KOBERT.

Witnesses:
C. E. MULREANY,
A. C. STARCK.